US012043807B2

(12) United States Patent
Lee

(10) Patent No.: US 12,043,807 B2
(45) Date of Patent: *Jul. 23, 2024

(54) SHIP FUEL OIL PRETREATMENT DESULFURIZATION SYSTEM USING PRETREATMENT DESULFURIZATION AGENT

(71) Applicant: LOWCARBON CO., LTD., Jeollanam-do (KR)

(72) Inventor: Cheol Lee, Cheongju-si (KR)

(73) Assignee: LOWCARBON CO., LTD., Jeollanam-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/754,416

(22) PCT Filed: Sep. 17, 2020

(86) PCT No.: PCT/KR2020/012551

§ 371 (c)(1),
(2) Date: Mar. 31, 2022

(87) PCT Pub. No.: WO2021/091077

PCT Pub. Date: May 14, 2021

(65) Prior Publication Data

US 2023/0002694 A1 Jan. 5, 2023

(30) Foreign Application Priority Data

Nov. 5, 2019 (KR) ........................ 10-2019-0139980

(51) Int. Cl.
*C10L 1/12* (2006.01)

(52) U.S. Cl.
CPC ........... *C10L 1/1233* (2013.01); *C10L 1/1291* (2013.01); *C10L 2230/02* (2013.01);
(Continued)

(58) Field of Classification Search
CPC .... Y02A 50/20; F02M 37/0047; F02M 25/00; C10G 29/04; C10G 29/06; C10G 53/08;
(Continued)

(56) References Cited

U.S. PATENT DOCUMENTS

2019/0085255 A1* 3/2019 Lee ............................ F23J 7/00

FOREIGN PATENT DOCUMENTS

JP 2018-149842 A 9/2018
KR 10-2006-0106331 A 10/2006
(Continued)

OTHER PUBLICATIONS

International Search Report for International application No. PCT/KR2020/012551, Dec. 23, 2020, ISA/KR.

*Primary Examiner* — Vishal V Vasisth
(74) *Attorney, Agent, or Firm* — ArentFox Schiff LLP

(57) ABSTRACT

Proposed is a pretreatment desulfurization system including a desulfurization agent storage tank for storing a liquid-phase pretreatment desulfurization agent and a metering pump for supplying the liquid-phase pretreatment desulfurization agent from the desulfurization agent storage tank to a fuel supply line through which marine fuel oil is supplied to a marine engine in a predetermined ratio. Since a fluid mixture composed of the marine fuel oil and the pretreatment desulfurization agent is supplied to the marine engine, sulfur oxides are adsorbed and removed during combustion of the fluid mixture.

12 Claims, 4 Drawing Sheets

(52) U.S. Cl.
CPC ... *C10L 2270/026* (2013.01); *C10L 2290/141* (2013.01); *C10L 2290/542* (2013.01); *C10L 2300/40* (2013.01)

(58) Field of Classification Search
CPC ........ C10G 27/12; C10G 53/14; C10G 29/02; C10G 29/16; C10L 10/02; C10L 1/04; C10L 1/1233; C10L 1/1291; C10L 1/12; C10L 1/1258; C10L 2200/0272; C10L 2200/0231; C10L 2290/542; C10L 2200/029; C10L 2200/0446; C10L 2200/0236; C10L 2200/024; C10L 2200/0222; C10L 2200/0218; C10L 2230/02; C10L 2290/141; C10L 2200/0438; C10L 2290/24; C10L 2200/0209; C10L 2270/026; C10L 1/1208; C10L 2300/40; C10L 2200/0213; C10L 2200/0268
See application file for complete search history.

(56) References Cited

FOREIGN PATENT DOCUMENTS

| | | | |
|---|---|---|---|
| KR | 10-2009-0005852 | A | 1/2009 |
| KR | 10-1836047 | B1 | 3/2018 |
| KR | 10-1864999 | B1 | 6/2018 |

* cited by examiner

※In graph, a hunting portion represents a sample line cleaning period or a filter replacement period.

※In graph, a hunting portion represents a sample line cleaning period or a filter replacement period

SHIP FUEL OIL PRETREATMENT DESULFURIZATION SYSTEM USING PRETREATMENT DESULFURIZATION AGENT

CROSS-REFERENCE TO RELATED APPLICATION

This application is a 371 U.S. national stage of PCT/KR2020/012551, filed Sep. 17, 2020 which claims the benefit of Korean Patent Application No. 10-2019-0139980, filed Nov. 5, 2019, the contents of each of which are incorporated herein by reference.

TECHNICAL FIELD

The present invention relates to a marine fuel oil pretreatment desulfurization system using a pretreatment desulfurization agent. More particularly, the present invention relates to a marine fuel oil pretreatment desulfurization system using a pretreatment desulfurization agent having a pretreatment desulfurization function, the system being capable of absorbing and reducing sulfur oxides ($SO_X$) when marine fuel oil such as bunker C-oil commonly used as a fuel for a marine engine is burned, thereby reducing sulfur oxides ($SO_X$) emissions during combustion of the marine fuel oil.

BACKGROUND ART

Sulfur oxides ($SO_X$) and nitrogen oxides ($NO_x$) are pointed out as pollutants that cause air pollution. In particular, sulfur oxides are contained in industrial flue gas emitted from the combustion of fossil fuels containing sulfur, and the sulfur oxides cause various environmental pollution problems such as acid rain.

Desulfurization technology for removing sulfur oxides from industrial flue gas has been continuously studied, and a flue gas desulfurization method of treating flue gas after combustion of fossil fuels has been generally used in factories or power plants.

The flue gas desulfurization method refers to a method of desulfurizing the flue gas after burning a fossil fuels containing sulfur, and the flue gas desulfurization methods are categorized into wet treatment and dry treatment. A wet treatment method removes sulfur oxides by washing flue gas with ammonia water, sodium hydroxide solution, lime milk, etc. while a dry treatment method removes sulfur oxides by brining particles or powders of activated carbon or carbonates into contact with flue gas to adsorb or react with sulfur dioxide.

In particular, the sulfur oxide content of heavy fuel oil (MGO, MDO, or DDO) such as bunker C-oil used in marine engines is 1,000 to 3,000 times higher than that of automobile fuel. The amount of sulfur oxides emitted by ships around the world is 130 times higher than that by automobiles and thus is known as the main cause of environmental pollution.

For this reason, conventionally, flue gas desulfurization, which is a post-treatment process performed after combustion of fuel, is used. The fuel gas desulfurization uses a marine wet desulfurization system to remove sulfur oxides emitted from marine engines. In the wet desulfurization system, a pump is used to supply washing water (NaOH), which is usually, to a scrubber through a cooler, and the washing water comes into contact with flue gas in the scrubber. In this case, sulfur oxides are removed through a pose-treatment process.

In this case, to maintain or boost the sulfur oxide removal capability of the wet desulfurization system at or to a predetermined level, the pH of the washing water is monitored, and the supply amount of the washing water is automatically controlled. To recycle the washing water, the used washing water is purified, and a huge amount of sludge is generated during the purification of the washing water. The sludge is usually collected and stored in a sludge tank during sailing, and the sludge is treated after the ship is anchored.

As described above, the conventional post-treatment wet desulfurization technology requires a lot of manpower and cost due to the complicated washing water purification process, and it is necessary to separately construct a separate complex desulfurization facility. Therefore, it is difficult to apply such a conventional desulfurization system to currently operating ships. That is, there is a problem that it is not easy and practical to use the conventional desulfurization system in an existing ship in terms of space and cost.

Therefore, in order to dramatically reduce the environmental pollution caused by the combustion of marine fuel oil and by the emission of sulfur oxides, research on an effective pretreatment desulfurization system that can significantly reduce the emission of sulfur oxides, can easily remove sulfur oxides, and can be easily applied to an existing ship is urgently needed.

DISCLOSURE

Technical Problem

The present invention has been made to solve the problems occurring in the related art, and an objective of the present invention is to provide a pretreatment desulfurization system for marine fuel oil, the system being capable of preventing sulfur oxides from being discharged into the air during the combustion of high sulfur marine fuel oil, being able to be simply and easily applied to an existing ship, and having a high desulfurization effect.

Technical Solution

In order to solve the technical problem, according to one embodiment of the present invention, there is provided a pretreatment desulfurization system including: a desulfurization agent storage tank for storing a liquid-phase pretreatment desulfurization agent; and a metering pump for supplying the liquid-phase pretreatment desulfurization agent from the desulfurization agent storage tank to a fuel supply line through which marine fuel oil is supplied to a marine engine in a predetermined ratio. Since a fluid mixture composed of the marine fuel oil and the pretreatment desulfurization agent is supplied to the marine engine, sulfur oxides are adsorbed and removed during combustion of the fluid mixture.

In addition, according to one embodiment, the pretreatment desulfurization agent may include: (a) at least one oxide selected from the group consisting of $SiO_2$, $Al_2O_3$, $Fe_2O_3$, $TiO_2$, MgO, MnO, CaO, $Na_2O$, $K_2O$, and $P_2O_3$; (b) at least one metal selected from the group consisting of Li, Cr, Co, Ni, Cu, Zn, Ga, Sr, Cd, and Pb; and (c) at least one liquid composition selected from the group consisting of sodium tetraborate ($Na_2B_4O_7 \cdot 10H_2O$), sodium hydroxide (NaOH), sodium silicate ($Na_2SiO_3$), and hydrogen peroxide ($H_2O_2$).

In addition, according to one embodiment, the oxide may include 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, 20 to 200 parts by weight of CaO, 15 to 45 parts by weight of $Na_2O$, 20 to 50 parts by weight of $K_2O$, and 5 to 20 parts by weight of $P_2O_3$, and the metal may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

In addition, according to one embodiment, the oxide and metal may have a particle size of 1 to 2 μm and a specific gravity of 2.5 to 3.0.

In addition, according to one embodiment, the sodium tetraborate ($Na_2B_4O_7 \cdot 10H_2O$) may be contained in an amount of 20 to 130 parts by weight, the sodium hydroxide (NaOH) may be contained in an amount of 15 to 120 parts by weight, the sodium silicate ($Na_2SiO_3$) may be contained in an amount of 50 to 250 parts by weight, and the hydrogen peroxide ($H_2O_2$) may be contained in an amount of 10 to 50 parts by weight.

In addition, according to one embodiment, the pretreatment desulfurization agent may be configured such that the oxide, the metal, and the liquid composition form a metal chelate compound.

In addition, according to one embodiment, the pretreatment desulfurization agent may have a sulfur oxide ($SO_X$) adsorption effect that is activated at a temperature in a range of 400° C. to 1200° C.

In addition, according to one embodiment, the pretreatment desulfurization agent may be mixed with the marine fuel oil in a ratio of 0.1 to 10 parts by weight to 100 parts by weight.

In addition, according to one embodiment, the pretreatment desulfurization agent may be mixed with the marine fuel oil in a ratio of 6 parts by weight to 100 parts by weight.

In addition, according to one embodiment, the fuel supply line may be equipped with a line mixer, and the metering pump may introduce the pretreatment desulfurization agent into the marine fuel oil in a state in which the metering pump is connected to the line mixer.

In addition, according to one embodiment, a flow meter, a check valve, and a pressure gauge may be further included between the line mixer and the metering pump.

In addition, according to one embodiment, the marine fuel oil may be any heavy oil among heavy oils including bunker-A oil, bunker-B oil, and bunker-C oil, or any light oil among light oils including MGO, MDO, and DDO.

Advantageous Effects

According to the present invention, the marine fuel oil pretreatment desulfurization system using the pretreatment desulfurization agent can prevent a large amount of sulfur oxides from being emitted into the air during combustion of high sulfur marine fuel oil, thereby greatly contributing to solving the problem of air pollution caused by sulfur oxides.

In addition, the pretreatment desulfurization system of the present invention is different from a conventional desulfurization system in which exhaust gas is desulfurized after the combustion of fuel. That is, the pretreatment desulfurization agent is mixed with marine fuel oil before the marine fuel oil is combusted, and the marine fuel oil and the pretreatment desulfurization agent are combusted together by a marine engine. It is easy and simple to apply the pretreatment desulfurization system to an existing ship by connecting the predetermined desulfurization system to a fuel supply system for an existing marine engine without requiring an additional desulfurization facility, and the pretreatment desulfurization system has a high desulfurization effect.

BEST MODE

Figure 1:
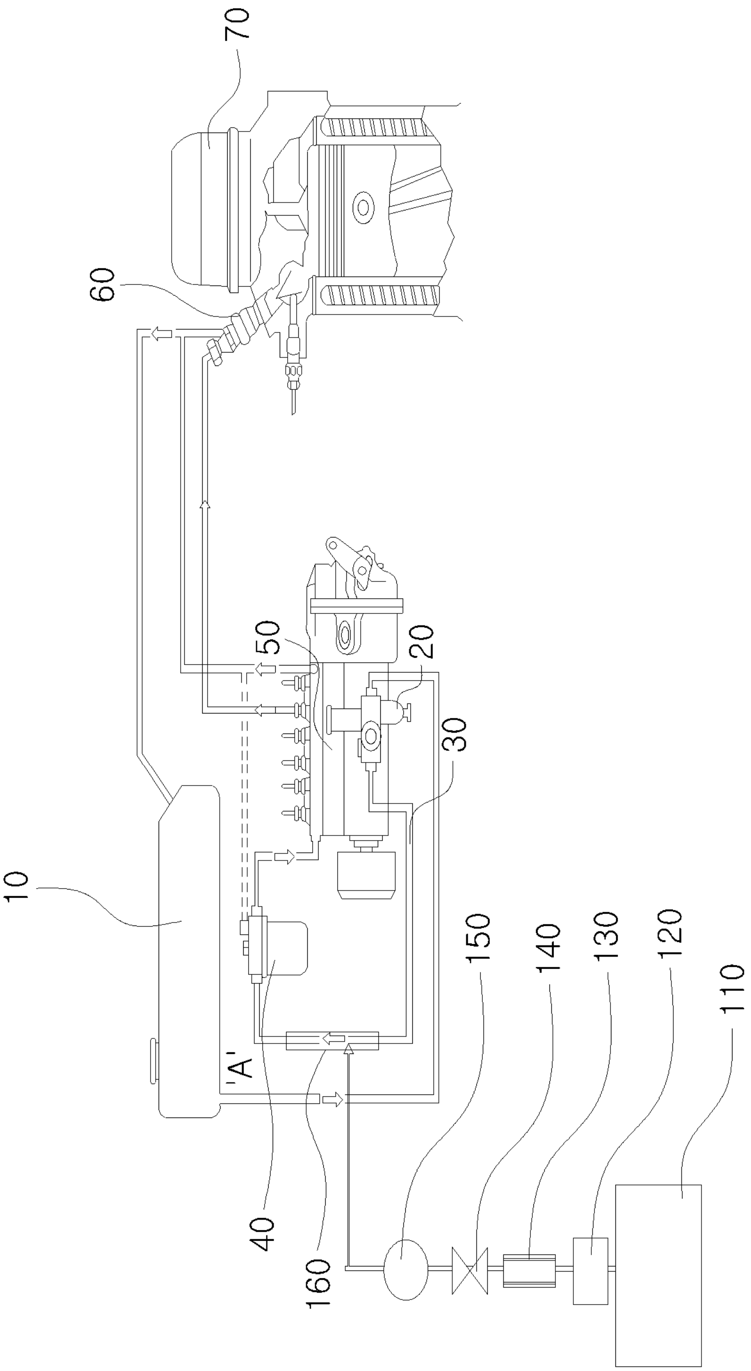
FIG. 1 is an exemplary view illustrating the construction of a pretreatment desulfurization system according to the present invention.

In the following description, the specific structural or functional descriptions for exemplary embodiments according to the concept of the present disclosure are merely for illustrative purposes. So, those skilled in the art will appreciate that various modifications and changes to the exemplary embodiments are possible, without departing from the scope and spirit of the present disclosure. Therefore, the present disclosure is intended to cover not only the exemplary embodiments but also various alternatives, modifications, equivalents, and other embodiments that may be included within the spirit and scope of the embodiments as defined by the appended claims. Hereinafter, embodiments of the present invention will be described in detail in conjunction with the accompanying drawings.

The present invention uses a desulfurization catalyst (hereinafter, referred to as "pretreatment desulfurization agent") including: (a) at least one oxide selected from the group consisting of $SiO_2$, $Al_2O_3$, $Fe_2O_3$, $TiO_2$, MgO, MnO, CaO, $Na_2O$, $K_2O$, and $P_2O_3$; (b) at least one metal selected from the group consisting of Li, Cr, Co, Ni, Cu, Zn, Ga, Sr, Cd, and Pb; and (c) at least one liquid composition selected from the group consisting of sodium tetraborate ($Na_2B_4O_7 \cdot 10\ H_2O$), sodium hydroxide (NaOH), sodium silicate ($Na_2SiO_3$) and hydrogen peroxide ($H_2O_2$).

The pretreatment desulfurization agent according to the present invention preferably includes at least one oxide selected from the group consisting of $SiO_2$, $Al_2O_3$, $Fe_2O_3$, $TiO_2$, MgO, MnO, CaO, $Na_2O$, $K_2O$, and $P_2O_3$. Preferably, the pretreatment desulfurization agent includes all of the oxides selected from the group consisting of $SiO_2$, $Al_2O_3$, $Fe_2O_3$, $TiO_2$, MgO, MnO, CaO, $Na_2O$, $K_2O$, and $P_2O_3$ as in one example described below.

When including all of $SiO_2$, $Al_2O_3$, $Fe_2O_3$, $TiO_2$, MgO, MnO, CaO, $Na_2O$, $K_2O$, and $P_2O_3$, the basic formula is $K_{0.8\text{-}0.9}\ (Al, Fe, Mg)_2\ (Si, Al)_4O_{10}\ (OH)_2$ which is a mineral commonly called illite. The illite has a 2:1 structure in which one octahedral layer is bonded between two tetrahedral layers. The octahedral layer has a dioctahedral structure in which only 2 cation sites out of 3 cation sites in the bonding structure are filled with cations. Due to the lack of cations, the illite is overall negatively charged (−). For this reason, sulfur oxides ($SO_X$) can be adsorbed when the mixture of a combustible material and the desulfurization catalyst is burned.

As the oxides, the pretreatment desulfurization agent may include 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, and 20 to 200 parts by weight of CaO, 15 to 45 parts by weight of $Na_2O$, 20 to 50 parts by weight of $K_2O$, and 5 to 20 parts by weight of $P_2O_3$.

In addition, the oxides may be mixed and pulverized into fine particles having a particle size of 1 to 2 μm by a pulverizer before being prepared as the desulfurization catalyst. The oxides may have a specific gravity of 2.5 to 3.0 and may be in the form of powder that is streak-colored or silvery white.

The pretreatment desulfurization agent according to the present invention may include one or more metals selected from the group consisting of Li, Cr, Co, Ni, Cu, Zn, Ga, Sr, Cd, and Pb. As in one embodiment, all of the metals including Li, Cr, Co, Ni, Cu, Zn, Ga, Sr, Cd, and Pb are preferably included.

As the metals, the pretreatment desulfurization agent may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

In addition, the metals, like the oxides, may be mixed and pulverized into fine particles having a particle size of 1 to 2 μm by a pulverizer, the metals may have a specific gravity of 2.5 to 3.0, and the metals may be in the form of powder that is streak-colored and silvery white.

The pretreatment desulfurization agent according to the present invention may include at least one liquid composition selected from the group consisting of sodium tetraborate ($Na_2B_4O_7{\cdot}10H_2O$), sodium hydroxide (NaOH), sodium silicate ($Na_2SiO_3$) and hydrogen peroxide ($H_2O_2$) Preferably, as in one embodiment, all of the liquid compositions including sodium tetraborate, sodium hydroxide, sodium silicate, and hydrogen peroxide may be contained.

The pretreatment desulfurization agent according to the present invention forms a metal chelate compound through coordination with the metals because the oxides and the liquid compositions are mixed and reacted to serve as a chelating agent.

In addition, the liquid composition may be adsorbed on ash generated when a combustible material is combusted so that the liquid composition may react with sulfur oxides present in the ash, thereby removing the sulfur oxides. $NaBO_2$ is derived from the sodium tetraborate ($Na_2B_4O_7$), $NaBH_4$ is produced through hydrogenation, and the produced $NaBH_4$ reacts with oxygen and sulfur oxides to form sodium sulfate ($Na_2SO_4$). Thus, the sulfur oxides are removed. The reactions are represented by Reaction Formulas 1 and 2 below.

$$NaBH_4+O_3 \rightarrow Na_2O_2+H_2O+B \qquad \text{[Reaction Formula 1]}$$

$$1)Na_2O_2+SO_3 \rightarrow Na_2SO_{4+O}\ 2)Na_2O_2+SO_2 \rightarrow Na_2SO_4\ 3)Na_2O_2+SO \rightarrow Na_2SO_3 \qquad \text{[Reaction Formula 2]}$$

In addition, as the liquid compositions, the sodium tetraborate, the sodium hydroxide, the sodium silicate, and the hydrogen peroxide may be included in amounts of 20 to 130 parts by weight, 15 to 120 parts by weight, 50 to 250 parts by weight, and 10 to 50 parts by weight, respectively in the pretreatment desulfurization agent.

When the pretreatment desulfurization agent according to the present invention is mixed with a combustible material and combusted together at a temperature in a range of 400° C. to 1200° C., the effect of adsorbing sulfur oxides can be activated. However, when the mixture is combusted in a temperature range of 600° C. to 900° C., high efficiency can be obtained.

Hereinafter, a method of preparing the pretreatment desulfurization agent according to the present invention will be described.

The pretreatment desulfurization agent according to the present invention is prepared through a method including: (a) preparing an oxide powder by mixing and finely pulverizing at least one oxide selected from the group consisting of $SiO_2$, $Al_2O_3$, $Fe_2O_3$, $TiO_2$, MgO, MnO, CaO, $Na_2O$, $K_2O$, and $P_2O_3$; (b) preparing a metal powder by mixing and finely pulverizing at least one metal selected from the group consisting of Li, Cr, Co, Ni, Cu, Zn, Ga, Sr, Cd, and Pb; and (c) mixing the oxide mixture prepared in (a) and the metal mixture prepared in (b) with at least one liquid composition selected from the group consisting of sodium tetraborate ($Na_2B_4O_7{\cdot}10\ H_2O$), sodium hydroxide (NaOH), sodium silicate ($Na_2SiO_3$), and hydrogen peroxide ($H_2O_2$)

In step (a), the oxide powder including at least one oxide selected from the group consisting of $SiO_2$, $Al_2O_3$, $Fe_2O_3$, $TiO_2$, MgO, MnO, CaO, $Na_2O$, $K_2O$, and $P_2O_3$ is mixed and finely ground with a fine pulverizer.

In this step, the oxide power includes 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, and 20 to 200 parts by weight of CaO, 15 to 45 parts by weight of $Na_2O$, 20 to 50 parts by weight of $K_2O$, and 5 to 20 parts by weight of $P_2O_3$.

In addition, the finely ground oxide powder may be ground repeatedly until the particle size of the powder falls within a range of 1 to 2 μm.

In step (b), the metal powder including at least one metal selected from the group consisting of Li, Cr, Co, Ni, Cu, Zn, Ga, Sr, Cd and Pb is mixed and ground with a fine pulverizer.

The metal powder may include 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

In addition, the finely ground metal powder may be ground repeatedly until the particle size of the powder falls within a range of 1 to 2 μm.

In step (c), at least one liquid composition selected from the group consisting of sodium tetraborate ($Na_2B_4O_7.10H_2O$), sodium hydroxide (NaOH), sodium silicate ($Na_2SiO_3$), and hydrogen peroxide ($H_2O_2$) is mixed with the finely ground oxide powder and the finely ground metal powder prepared in step (a) and step (b) to prepare a desulfurization catalyst.

In this step, the sodium tetraborate ($Na_2B_4O_7{\cdot}10H_2O$) may be contained in an amount of 20 to 130 parts by weight, the sodium hydroxide (NaOH) may be contained in an amount of 15 to 120 parts by weight, the sodium silicate ($Na_2SiO_3$) may be contained in an amount of 50 to 250 parts by weight, and the hydrogen peroxide ($H_2O_2$) may be contained in an amount of 10 to 50 parts by weight.

In addition, in this step, when mixing and reacting the mixed and finely ground oxide and metal powders prepared in steps (a) and (b), the oxide powder and the liquid composition act as a chelating agent so that a metal chelate compound can be formed.

In addition, the pretreatment desulfurization agent formed in this step is stabilized by sedimentation for 24 to 72 hours, and the sedimented pretreatment desulfurization agent is separated and dried naturally to be used as a powder catalyst for desulfurization. The liquid composition remaining after the sedimented desulfurization catalyst is separated may be used as a liquid catalyst for desulfurization.

In addition, in the desulfurization method using the pretreatment desulfurization agent according to the present invention, the desulfurization function may be activated when it is mixed and combusted with a combustible material.

A conventional desulfurization method removes sulfur oxides ($SO_x$) from flue gas generated during combustion of a combustible material. The conventional method requires a desulfurization facility for performing the desulfurization process and incurs manpower and cost for operating the desulfurization facility. However, since the desulfurization method of the present invention burns the pretreatment desulfurization agent along with the combustible material, the pretreatment desulfurization agent removes sulfur oxides through adsorption during the combustion, thereby reducing the content of sulfur oxides in flue gas. In this way, the method of the present invention exhibits a desulfurization effect.

In addition, the combustible material to which the pretreatment desulfurization agent according to the present invention can be applied may be a combustible material that generates heat through combustion. Examples of the combustible material include coal, petroleum, waste, and biogas.

In addition, as described above, the pretreatment desulfurization agent is separated into a powder catalyst for desulfurization and a liquid catalyst for desulfurization. Each of the powder catalyst and the liquid catalyst is used alone or in combination with the other, depending on the contents of C, H, N, and S of the combustible material. Therefore, the pretreatment desulfurization agent of the present invention can exhibit an excellent desulfurization effect in a simple and easy way of use.

Hereinafter, the configuration of a pretreatment desulfurization system according to one embodiment of the present invention, which is to be applied to a marine engine, will be described in detail with reference to FIG. 1.

The pretreatment desulfurization system according to the present invention is connected to a fuel supply line 30 of a marine engine 70 to supply the pretreatment desulfurization agent (liquid catalyst for desulfurization) in a certain mixing ratio with respect to fuel.

Usually, as the fuel of the marine engine 70, marine fuel oil, for example, heavy oil such as bunker-A oil, bunker-B oil, or bunker-C oil, or light oil such as MGO, MDO, or DDO is used. Among them, bunker C oil is a high sulfur oil and generates a large amount of sulfur oxides during combustion thereof. Therefore, the use of bunker-C oil is regulated due to air pollution.

In FIG. 1, reference numerals 10, 20, 30, 40, 50, and 60 denote a fuel tank, a fuel supply pump, a fuel supply line, a fuel filter, an injection pump, and an injection nozzle, respectively. A detailed description of the components will be omitted.

To this end, the pretreatment desulfurization system according to the present invention is equipped with a desulfurization agent tank 110 having a predetermined volume for storing the pretreatment desulfurization agent, and one end of the desulfurization agent tank 110 is connected to a metering pump 130 for quantitatively supplying the pretreatment desulfurization agent.

In addition, a flow meter 120 for checking the input flow rate of the pretreatment desulfurization agent, a check valve 140 for adjusting the input flow rate, and a pressure gauge 150 are installed on the fuel supply line 30 between the metering pump 130 and the marine engine 70. Therefore, it is possible to continuously check the fuel supply amount to the marine engine 70 and regulate the supply of the pretreatment desulfurization agent so that the pretreatment desulfurization agent is supplied in a predetermined ratio with respect to the fuel supply amount.

The pretreatment desulfurization agent is preferably supplied and mixed in an amount of 0.1% to 10% by weight relative to 100% by weight of the marine fuel oil.

Figure 2:
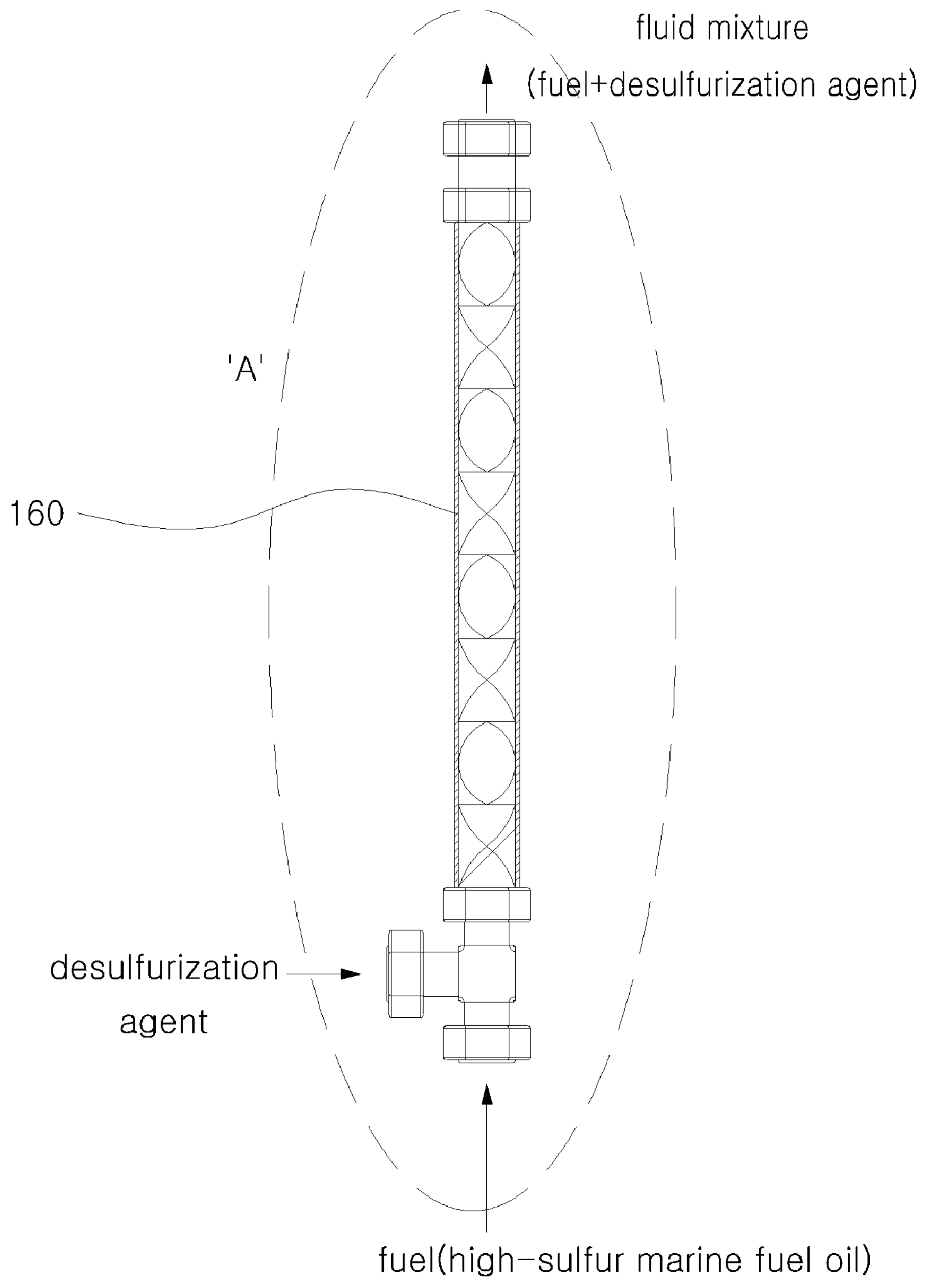
FIG. 2 is a partially enlarged view of a region A of FIG. 1.

Referring to FIG. 2, the pretreatment desulfurization agent is connected to a line mixer 160 provided on the fuel supply line 30 for supplying the marine fuel oil, and the pretreatment desulfurization agent injected from one side and the marine fuel oil are sufficiently mixed in the line mixer 160 (this process is called line mixing). The sufficiently mixed fluid mixture of the marine fuel oil and the pretreatment desulfurization agent is supplied to the marine engine.

Thereafter, the fluid mixture is combusted in the marine engine. Therefore, sulfur oxides generated during a combustion process are adsorbed and removed by the pretreatment desulfurization agent before being discharged to the outside.

Through this process, even when high-sulfur marine fuel oil such as bunker-C oil is used as fuel, since sulfur oxides are almost perfectly removed during the combustion, it is possible to solve the air pollution problem caused by sulfur oxides.

Hereinafter, the present invention will be described in more detail with reference to Examples and Test Examples.

Examples and Test Examples presented herein are only for illustrative purposes and are not intended to limit the scope of the present invention.

<Example> Preparation of Pretreatment Desulfurization Agent

As oxides, $SiO_2$ 150 kg, $Al_2O_3$ 150 kg, $Fe_2O_3$ 100 kg, $TiO_2$ 50 kg, MgO 200 kg, MnO 100 kg, CaO 200 kg, $Na_2O$ 150 kg, $K_2O$ 200 kg, and $P_2O_3$ 50 kg were mixed and finely ground to form fine oxide powder.

As metals, Li 35 g, Cr 50 g, Co 10 g, Ni 60 g, Cu 180 g, Zn 350 g, Ga 400 g, Sr 200 g, Cd 20 g, and Pb 30 g were mixed and finely ground to form fine metal powder.

The fine oxide powder and the fine metal powder are repeatedly ground to have a particle size of 1 to 2 μm.

3000 kg of water was put into a reactor, the water was maintained at a temperature of 50° C. to 60° C., and 50 kg of sodium tetraborate ($Na_2B_4O_7 \cdot 10H_2O$) were added thereto. After stirring for 30 minutes, 100 kg of sodium hydroxide (NaOH) was added and stirred. Next, after 10 minutes, the fine oxide powder was added in units of 100 kg at intervals of 5 minutes and stirred for 2 hours or more. While stirring, the temperature was raised to 60° C. to 80° C., and 100 kg of sodium silicate ($Na_2SiO_3$) was added. After stirring for 30 minutes, the fine metal powder was added in units of 20 g at intervals of 3 minutes and stirred. After stirring for 1 hour, 30 kg of hydrogen peroxide ($H_2O_2$) was added, stirred for another 30 minutes, and then naturally cooled for 1 hour.

After cooling and stabilizing for 48 hours, the liquid composition and the sedimented powder composition are separated from each other.

The sedimented powder composition was dried naturally and named as a powder catalyst for desulfurization (GTS-P).

In addition, the liquid composition remaining after the sedimented powder composition was removed was moved to a separate container and named as a liquid catalyst for desulfurization (GTS-W).

<Experimental Example 1> Test for Checking Reduction in Sulfur Oxide in Marine Engine Exhaust Gas (1) Test Condition In order to evaluate the desulfurization efficiency of the pretreatment desulfurization agent (liquid catalyst for desulfurization) prepared as described above, 3.5% and 6.0% by weight of the pretreatment desulfurization agent was supplied to a fuel supply line connected to a marine engine so as to be mixed with 100% by weight of fuel, and the mixture was burned. Next, a sulfur oxide reduction performance test was conducted to analyze and compare the concentration of sulfur oxides in exhaust gas.

The specifications of the marine engine used for the test are shown in Table 1 below.

TABLE 1

| Specifications of engine for test | |
|---|---|
| Maker | Yanmar |
| Model | 4LOD |
| Horse power (Hp) | 200 |
| Number of Cylinders | 4 in-line |
| Combustion system | Direct injection |
| Aspiration | Natural aspirated |
| Dimensions (L × W × H, mm) | 500 × 1550 × 1400 |
| Cooling system | Direct water cooling |
| Marine gear | Mechanical |
| Fuel consumption rate | 100 mL/min |

Fuel used: Bunker-C oil

Operating conditions: no-load operation

Supply amount and method of pretreatment desulfurization agent: 3.5% and 6.0% by weight of the pretreatment desulfurization agent was mixed and supplied to the fuel supply line with a metering pump with respect to the fuel flow rate.

Exhaust gas analysis equipment: Germany VarioPlus Ind. MRU Emission Monitoring System Exhaust gas analysis method: exhaust gas was sampled from an exhaust pipe connected to the engine and with an analysis equipment (standard oxygen concentration of 17%)

Since the oxygen concentration in the exhaust gas was maintained at 17% to 18% in the engine no-load operation condition, the reference oxygen concentration was set to 17% to prevent an excessive difference between the measured concentration and the corrected concentration that is based on the reference oxygen concentration.

(2) Test Method and Procedures

1) Main engine operation state and normal state

2) Preheat exhaust gas analysis system and perform zero setting

3) Perform measurement in a condition in which no pretreatment desulfurization agent was injected (30 minutes)

4) Perform measurement in a condition in which 6.0% by weight of pretreatment desulfurization agent was injected (1 hour)

5) Repeat step 3) and step 4) one more time

6) Perform measurement in a condition in which no pretreatment desulfurization agent was injected (30 minutes)

7) Perform measurement in a condition in which 3.5% by weight of pretreatment desulfurization agent was injected (1 hour)

8) Perform measurement in a condition in which no pretreatment desulfurization agent was injected (30 minutes)

9) Perform measurement in a condition in which 6.0% by weight of pretreatment desulfurization agent was injected (1 hour)

10) Save data and stop analysis

TABLE 2

| Test Condition | |
|---|---|
| Time | Test condition |
| 11:21-11:54 | Fuel oil |
| 11:54-13:20 | Pretreatment desulfurization agent 6.0% by weight |
| 13:20-14:03 | Fuel oil |
| 14:03-15:06 | Pretreatment desulfurization agent 6.0% by weight |
| 15:06-15:46 | Fuel oil |
| 15:46-16:46 | Pretreatment desulfurization agent 3.5% by weight |
| 16:46-17:23 | Fuel oil |
| 17:23-18:25 | Pretreatment desulfurization agent 6.0% by weight |

(3) Result of Analysis of Sulfur Oxide ($SO_2$) Concentration (in Terms of 17% Reference Oxygen Concentration)

Figure 3:
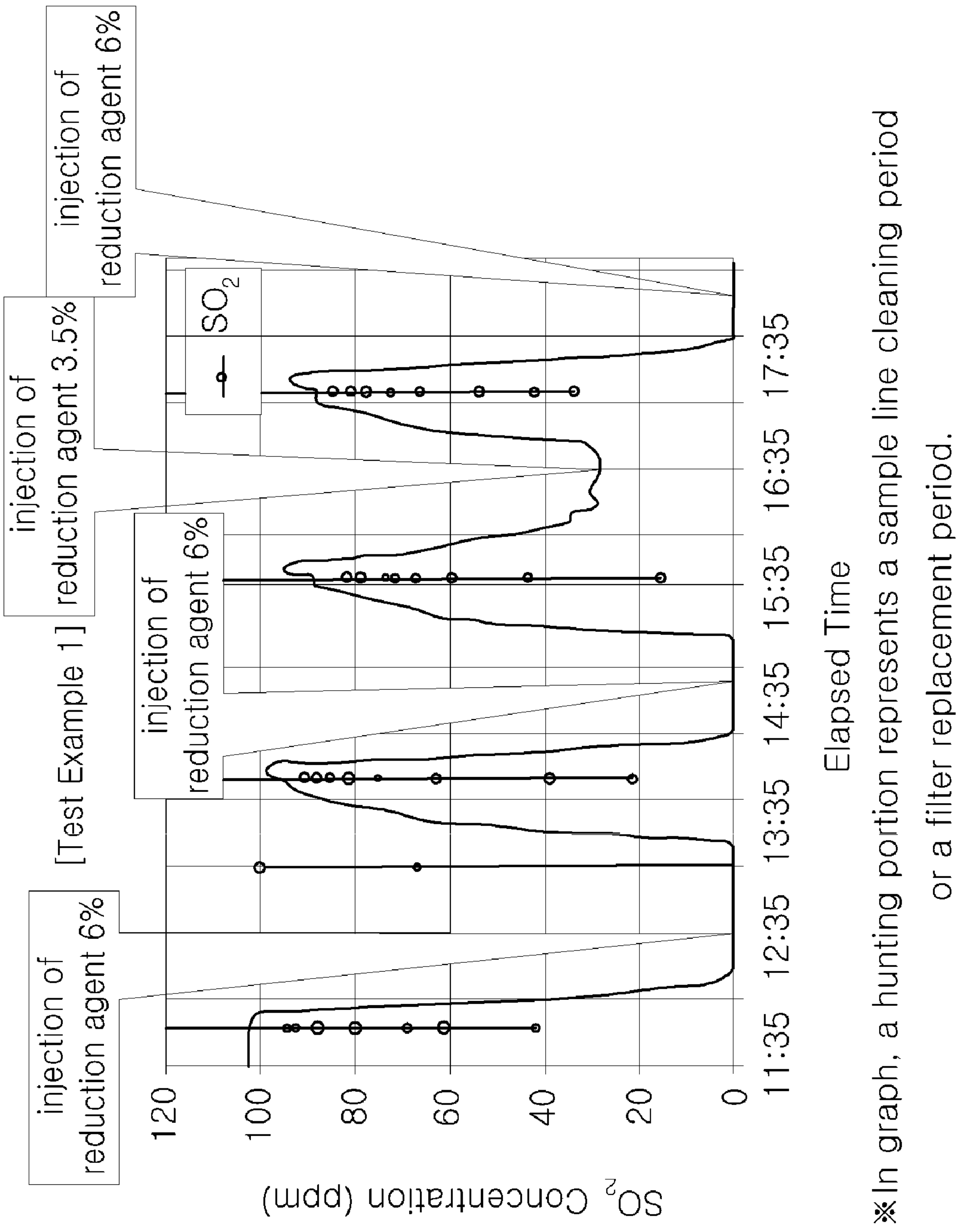
FIG. 3 is a view illustrating the result of analysis of a sulfur oxide ($SO_2$) concentration in the entire session of Experimental Example 1.

FIG. 3 shows the analysis results of sulfur oxide ($SO_2$) concentration for the entire session of Experimental Example 1 performed according to the test conditions, methods, and procedures described above, and Table 3 summarizes data of the values of $SO_2$ concentration in each measurement session of FIG. 3. (in terms of 17% of reference oxygen concentration)

TABLE 3

$SO_2$ concentration for each measurement session (in terms of 17% of reference oxygen concentration)

| Measurement time | Test condition | $SO_2$ concentration (ppm) | Note |
|---|---|---|---|
| 11:35-12:00 | Fuel oil | 102.00 | Average value |
| 12:23-13:00 | Pretreatment desulfurization agent 6.0% by weight | 0.01 | Average value |
| 14:08 | Fuel oil | 100.0 | Peak value |
| 14:26-15:15 | Pretreatment desulfurization agent 6.0% by weight | 0.00 | Average value |
| 15:51 | Fuel oil | 95.2 | Peak value |
| 16:22-16:52 | Pretreatment desulfurization agent 3.5% by weight | 29.19 | Average value |
| 17:28 | Fuel oil | 94.5 | Peak value |
| 17:50-18:25 | Pretreatment desulfurization agent 6.0% by weight | 0.00 | Average value |

Referring to FIG. 3 and Table 3, after 6.0% by weight and 3.5% by weight of the pretreatment desulfurization agent relative to 100% by weight of the fuel oil were sequentially injected into the fuel supply line, the concentration of $SO_2$ was measured for each case. That is, the test was performed with four measurement sessions.

In a first measurement session, when only fuel oil was burned (measurement time: 11:35-12:00), the concentration of $SO_2$ in the exhaust gas was 102.00 ppm, but when 6.0% by weight of the pretreatment desulfurization agent was input (measurement time: 12:23-13:00), the concentration of $SO_2$ rapidly dropped to 0.01 ppm.

In a second measurement session, when only fuel oil was burned (measurement time: 14:08), the concentration of $SO_2$ in the exhaust gas was 100.00 ppm, but when 6.0% by weight of the pretreatment desulfurization agent was added relative to 100% by weight of fuel oil (measurement time: 4:26-15:15), the concentration of $SO_2$ rapidly dropped to 0.00 ppm.

In a third measurement session, when only fuel oil was burned (measurement time 15:51), the concentration of $SO_2$ in the exhaust gas was 95.2 ppm, but when 3.5% by weight of the pretreatment desulfurization agent was added relative to 100% by weight of fuel oil (measurement time 16:22-16:52), the concentration of $SO_2$ rapidly dropped to 29.19 ppm.

In a fourth measurement session, when only fuel oil was burned (measurement time 17:28), the concentration of $SO_2$ in the exhaust gas was 94.5 ppm, but when 6.0% by weight of the pretreatment desulfurization agent was added relative to 100% by weight of fuel oil (measurement time 17:50-18:25), the concentration of $SO_2$ rapidly dropped to 0.00 ppm.

The measurement results showed that the effect of reducing the $SO_2$ emissions was improved when the mixing ratio of the pretreatment desulfurization agent was increased from 3.5% by weight to 6.0% by weight.

<Experimental Example 2> Test for Checking Reduction in Sulfur Oxide in Marine Engine Exhaust Gas (1) Test Condition The same as in Test Example 1

(2) Test Method and Procedures

The same as in Test Example 1

TABLE 4

| Test Condition | |
|---|---|
| Time | Test condition |
| 09:06-09:44 | Fuel oil |
| 09:44-10:54 | Pretreatment desulfurization agent 3.5% by weight |
| 10:54-11:10 | Fuel oil |
| 11:10-11:37 | Engine stop |
| 11:37-13:02 | Fuel oil |
| 12:02-13:08 | Pretreatment desulfurization agent 6.0% by weight |

(3) Result of Analysis of Sulfur Oxide ($SO_2$) Concentration (in Terms of 17% Reference Oxygen Concentration)

Figure 4:
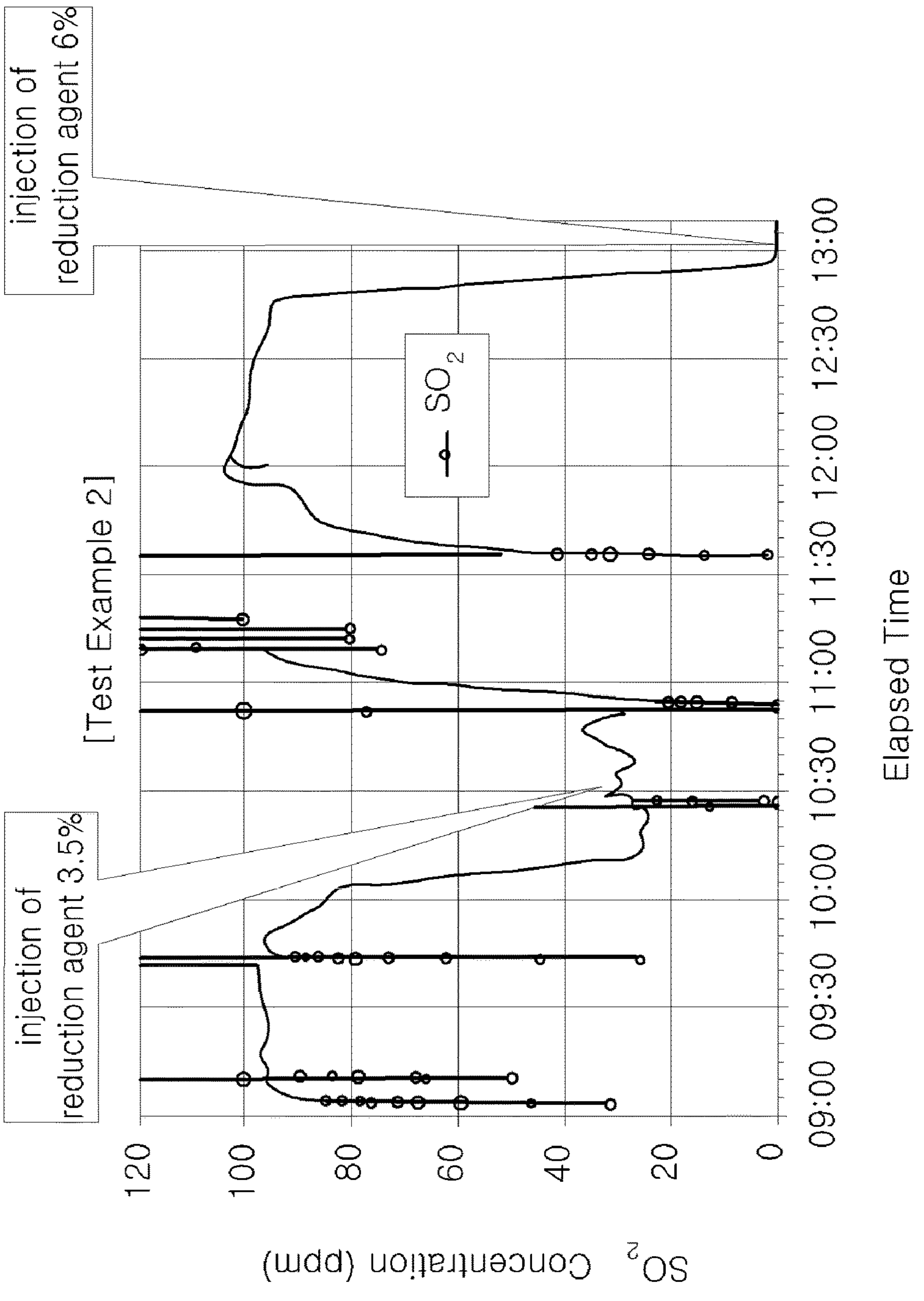
FIG. 4 is a view illustrating the result of analysis of a sulfur oxide ($SO_2$) concentration in the entire session of Experimental Example 2.

FIG. 4 shows the analysis results of the sulfur oxide ($SO_2$) concentration for the entire session of Experimental Example 2 performed according to the test conditions, methods, and procedures described above, and Table 5 is a table in which data values of the concentration of $SO_2$ in each measurement session of FIG. 4 are summarized. (In tams of a reference oxygen concentration of 17%)

TABLE 5

| $SO_2$ concentration for each measurement session (in terms of the reference oxygen concentration of 17%) | | | |
|---|---|---|---|
| Measurement time | Test condition | $SO_2$ concentration (ppm) | Note |
| 09:12-09:40 | Fuel oil | 96.43 | Average value |
| 10:18-10:51 | Pretreatment desulfurization agent 3.5% by weight | 29.54 | Average value |
| 11:55-12:44 | Fuel oil | 98.93 | Average value |
| 12:57-13:06 | Pretreatment desulfurization agent 6.0% by weight | 0.00 | Average value |

Referring to FIG. 4 and Table 5, after 6.0% by weight and 3.5% by weight of the pretreatment desulfurization agent relative to 100% by weight of the fuel oil were injected into the fuel supply line, the concentration of $SO_2$ was measured for each case. That is, the test was performed with two measurement sessions.

In a first measurement session, when only fuel oil was burned (measurement time: 09:12-09:40), the concentration of $SO_2$ in the exhaust gas was 96.43 ppm, but when 3.5% by weight of the pretreatment desulfurization agent was input with respect to 100% by weight of oil (measurement time: 10:18-10:51), the concentration of $SO_2$ rapidly dropped to 29.54 ppm.

In a second measurement session, when only fuel oil was burned (measurement time: 11:55-12:44), the concentration of $SO_2$ in the exhaust gas was 98.93 ppm, but when 6.0% by weight of the pretreatment desulfurization agent was input with respect to 100% by weight of oil (measurement time: 12:57-13:06), the concentration of $SO_2$ rapidly dropped to 0.00 ppm.

The measurement results showed that the effect of reducing the $SO_2$ emissions was improved when the mixing ratio of the pretreatment desulfurization agent was increased from 3.5% by weight to 6.0% by weight.

As can be seen from the results of Test Examples 1 and 2, when fuel and the pretreatment desulfurization agent were burned together, the $SO_2$ concentration in the exhaust gas was reduced by at least 69% and by 100% at a maximum compared to the case where only fuel is burned. In addition, when the pretreatment desulfurization agent was increased from 3.5% by weight to 6.0% by weight, the reduction in the $SO_2$ emissions was increased.

INDUSTRIAL APPLICABILITY

The present invention can be widely used in pretreatment desulfurization systems.

The invention claimed is:

1. A marine fuel oil pretreatment desulfurization system using a pretreatment desulfurization agent, the system comprising:

a desulfurization agent storage tank configured to store a liquid-phase pretreatment desulfurization agent; and a metering pump for supplying the desulfurization agent from the desulfurization agent storage tank to a fuel supply line through which marine fuel oil is supplied to a marine engine, in a predetermined ratio, wherein the marine fuel oil and the pretreatment desulfurization agent are mixed and the resulting mixture is supplied to the marine engine so that sulfur oxides are adsorbed and removed during combustion of the fluid mixture.

2. The system according to claim 1, wherein the pretreatment desulfurization agent comprises: (a) at least one oxide selected from the group consisting of $SiO_2$, $Al_2O_3$, $Fe_2O_3$, $TiO_2$, MgO, MnO, CaO, $Na_2O$, $K_2O$, and $P_2O_3$; (b) at least one metal selected from the group consisting of Li, Cr, Co, Ni, Cu, Zn, Ga, Sr, Cd, and Pb; and (c) at least one liquid composition selected from the group consisting of sodium tetraborate ($Na_2B_4O_7 \cdot 10H_2O$), sodium hydroxide (NaOH), sodium silicate ($Na_2SiO_3$), and hydrogen peroxide ($H_2O_2$).

3. The system according to claim 2, wherein the oxide comprises 15 to 90 parts by weight of $SiO_2$, 15 to 100 parts by weight of $Al_2O_3$, 10 to 50 parts by weight of $Fe_2O_3$, 5 to 15 parts by weight of $TiO_2$, 20 to 150 parts by weight of MgO, 10 to 20 parts by weight of MnO, and 20 to 200 parts by weight of CaO, 15 to 45 parts by weight of $Na_2O$, 20 to 50 parts by weight of $K_2O$, and 5 to 20 parts by weight of $P_2O_3$, and the metal comprises 0.0035 to 0.009 parts by weight of Li, 0.005 to 0.01 parts by weight of Cr, 0.001 to 0.005 parts by weight of Co, 0.006 to 0.015 parts by weight of Ni, 0.018 to 0.03 parts by weight of Cu, 0.035 to 0.05 parts by weight of Zn, 0.04 to 0.08 parts by weight of Ga, 0.02 to 0.05 parts by weight of Sr, 0.002 to 0.01 parts by weight of Cd, and 0.003 to 0.005 parts by weight of Pb.

4. The system according to claim 2, wherein the oxide and metal have a particle size of 1 to 2 μm and a specific gravity of 2.5 to 3.0.

5. The system according to claim 2, wherein the sodium tetraborate ($Na_2B_4O_7 \cdot 10H_2O$) is contained in an amount of 20 to 130 parts by weight, the sodium hydroxide (NaOH) is contained in an amount of 15 to 120 parts by weight, the sodium silicate ($Na_2SiO_3$) is contained in an amount of 50 to 250 parts by weight, and hydrogen peroxide ($H_2O_2$) is contained in an amount of 10 to 50 parts by weight.

6. The system according to claim 2, wherein the pretreatment desulfurization agent is configured such that the oxide, the metal, and the liquid composition form a metal chelate compound.

7. The system according to claim 2, wherein the pretreatment desulfurization agent has a sulfur oxide ($SO_X$) adsorption effect that is activated at temperatures in a range of 400° C. to 1200° C.

8. The system according to claim 1, wherein the pretreatment desulfurization agent is mixed in a ratio of 0.1 to 10 parts by weight with respect to 100 parts by weight of the marine fuel oil.

9. The system according to claim 1, wherein the pretreatment desulfurization agent is mixed in a ratio of 6 parts by weight with respect to 100 parts by weight of the marine fuel oil.

10. The system according to claim 1, wherein the fuel supply line is equipped with a line mixer, and the metering pump introduces the pretreatment desulfurization agent into the marine fuel oil in a state in which the metering pump is connected to the line mixer.

11. The system according to claim 10, further comprising a flow meter, a check valve, and a pressure gauge which are disposed between the line mixer and the metering pump.

12. The system according to claim 1, wherein the marine fuel oil is any heavy oil among heavy oils including bunker-A oil, bunker-B oil, and bunker-C oil, or any light oil among light oils including MGO, MDO, and DDO.

* * * * *